United States Patent [19]

Hardt et al.

[11] Patent Number: 5,011,651
[45] Date of Patent: Apr. 30, 1991

[54] ARRANGEMENT FOR TRANSFERRING FUEL RODS FROM A FIRST RECEPTACLE TO A SECOND RECEPTACLE

[75] Inventors: Norbert Hardt; Hakan Sterner, both of Hanover; Gerhard Wetzka, Veitshöchheim; Burkart Schulte, Minden, all of Fed. Rep. of Germany

[73] Assignee: Deutsche Gesellschaft für Wiederaufarbeitung von Kernbrennstoffen mbH, Hanover, Fed. Rep. of Germany

[21] Appl. No.: 408,524

[22] Filed: Sep. 18, 1989

[30] Foreign Application Priority Data

Sep. 19, 1988 [DE] Fed. Rep. of Germany ....... 3831773

[51] Int. Cl.$^5$ .......................... G21F 7/00; G21C 19/32
[52] U.S. Cl. ..................................... 376/261; 376/272; 414/146; 53/236; 206/443
[58] Field of Search ............... 376/261, 260, 262, 272, 376/245; 414/146, 217, 417; 206/443; 53/236, 169

[56] References Cited

U.S. PATENT DOCUMENTS

| | | | |
|---|---|---|---|
| 3,163,312 | 12/1964 | Chaplin | 206/443 |
| 3,466,445 | 9/1969 | Schlies | 250/507.1 |
| 4,363,402 | 12/1982 | Grzyll | 206/443 |
| 4,441,242 | 4/1984 | Hicken et al. | 376/261 |
| 4,535,250 | 8/1985 | Fields | 250/507.1 |
| 4,676,712 | 6/1987 | Hayward et al. | 376/272 |

*Primary Examiner*—Daniel D. Wasil
*Attorney, Agent, or Firm*—Walter Ottesen

[57] ABSTRACT

The invention is directed to an arrangement for transferring irradiated fuel rods from a trough-shaped receptacle into a canister intended for terminal storage. The canister is docked at a pass-through opening formed in a partition wall of a nuclear facility. The arrangement includes a trough-shaped insert which is movable out of the terminal storage canister while empty and through the pass-through opening into the trough-shaped receptacle whereat it is filled with the irradiated fuel rods and then returned back through the opening and into the terminal storage canister. In this way, and with little effort, a transfer of fuel rods is achieved without components disposed between the receptacle and canister becoming contaminated by radioactive particles.

2 Claims, 2 Drawing Sheets

5,011,651

ARRANGEMENT FOR TRANSFERRING FUEL RODS FROM A FIRST RECEPTACLE TO A SECOND RECEPTACLE

FIELD OF THE INVENTION

The invention relates to an arrangement for transferring irradiated fuel rods from a channel-shaped first receptacle into a second receptacle for terminal storage. During this transfer, the second receptacle is docked at a ventilation partition wall of a nuclear facility.

BACKGROUND OF THE INVENTION

When fuel rods are handled such as when laying the fuel rods into the first receptacle, the condition cannot be avoided that radioactive particles drop from the irradiated fuel rods. The fuel rods are customarily pushed out of the first receptacle through the partition wall and into the terminal storage receptacle. During this displacement of the fuel rods, the disadvantage occurs that components such as seals and the like become contaminated with the radioactive particles dropping from the fuel rods into the first receptacle. The components are exchangeable via remote manipulation and are located at the pass-through opening of the partition wall.

SUMMARY OF THE INVENTION

It is an object of the invention to provide an arrangement of the kind described above by means of which the transfer of fuel rods is provided without an accumulation of contamination occurring. It is another object of the invention to provide such a device wherein the transfer is effected with little effort.

The arrangement of the invention is for transferring irradiated fuel rods out of a trough-shaped receptacle into a canister intended for terminal storage. The canister is docked on a partition wall of a nuclear facility and the partition wall has a pass-through opening formed therein to permit the canister to communicate with the receptacle. The arrangement includes: a trough-shaped insert movable from an initial rest position in the canister wherein the insert is empty to a withdrawn position in the receptacle wherein the insert is loaded with the fuel rods and then returned to a final rest position in the canister.

With the arrangement according to the invention, irradiated fuel rods can be transferred from the trough-shaped receptacle through the partition wall and into the terminal storage canister without components located between the receptacle and the canister becoming contaminated with radioactive particles. The transfer from the trough-shaped receptacle is achieved with simple structural means.

An advantageous embodiment of the invention is achieved when the trough-shaped insert is configured to have the same contour in the region of its peripheral surface as the trough-shaped receptacle and the terminal storage canister. The insert is further configured with respect to its outer dimensions to be of such a degree smaller than the inner dimensions of both the receptacle and the canister so that the trough-shaped insert is easily movable and makes the largest possible use of the available volume in both the receptacle and the canister. In this way, the fuel rods are transferred without effort in such a quantity and by means of which a terminal storage canister is filled to its maximum in one working step.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
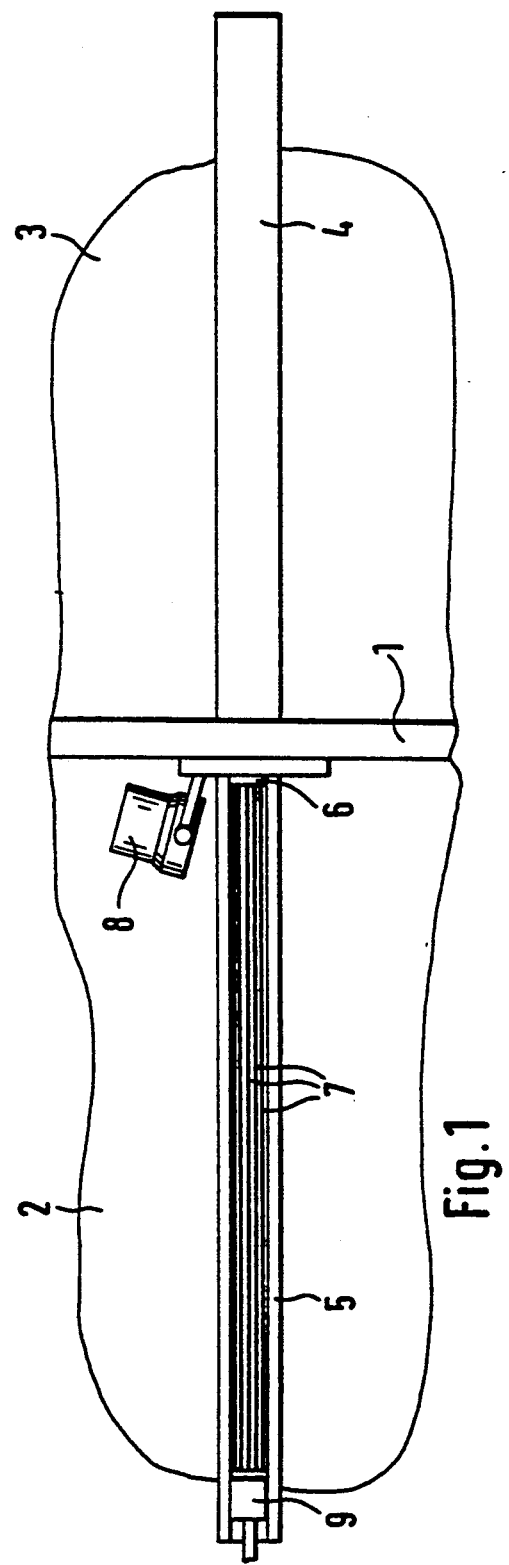
FIG. 1 is a plan view of the arrangement of the insert for transferring the fuel rods in combination with a trough-shaped receptacle, a partition wall and a terminal storage canister.

Reference numeral 1 identifies the vertical ventilation partition wall which separates chambers 2 and 3 from each other with respect to ventilation. The chamber 3 is provided for manipulating and loading a high-grade steel canister 4. The chamber 2 is exposed to open radioactivity since the irradiated nuclear fuel elements passed into chamber 2 are there disassembled. A high-grade steel receptacle 5 is disposed in chamber 2. The canister 4 is closed about its periphery and is placed in a terminal storage container after it has been loaded with fuel rods. The receptacle 5 is trough-shaped and functions as a receiving receptacle for a trough-shaped insert 6 made of high-grade sheet steel which takes up the fuel rods which are to be terminally stored.

The canister 4 as well as the receptacle 5 have an opening at their respective ends facing toward the partition wall 1 and which align with a pass-through opening in the partition wall 1 which is closeable by a hood 8. The canister 4 is docked at the partition wall by sealing and attachment means (not shown). The receptacle 5 is provided with a displacing rod 9 at its end facing away from the partition wall 1.

The operation of the arrangement according to the invention will now be described.

The canister 4 to be loaded is delivered with the insert 6 and docked at the partition wall 1. The pass-through opening in the partition wall 1 is cleared by a remotely-actuated hood 8 and the canister 4 is opened by remote manipulation. Thereafter, the receptacle 5 is docked with its end opening at the partition wall 1. The insert 6 is then pulled out of the canister 4 and into the receptacle 5 via the remotely-actuable displacing rod 9. The irradiated fuel rods 7 are filled into the insert 6 whereafter the filled insert 6 is again moved back into the canister 4 via the remotely-actuable displacement rod 9.

The receptacle 5 is then removed from its docked position at partition wall 1 and the pass-through opening of the partition wall 1 is again closed with the hood 8 and the canister 4 is again closed. Thereafter, the canister 4 is removed from its docked position at the partition wall 1 and placed in a terminal storage container whereafter it can be shipped for terminal storage at an appropriate underground location.

Figure 2:
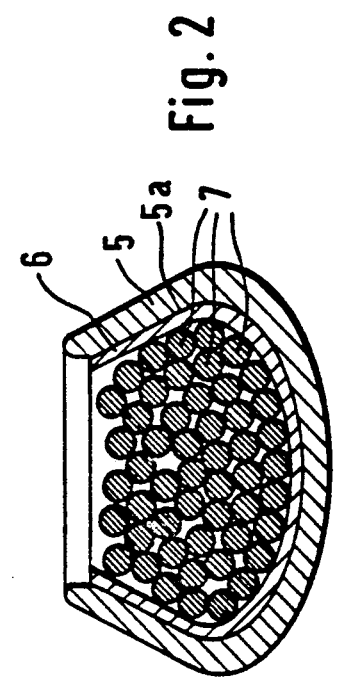
FIG. 2 is an enlarged section view of the arrangement of the insert of FIG. 1 shown seated in the trough-shaped receptacle; and, FIG. 3 is a section view of a portion of the canister with the trough-shaped insert disposed therein and loaded with irradiated fuel rods.
Figure 3:
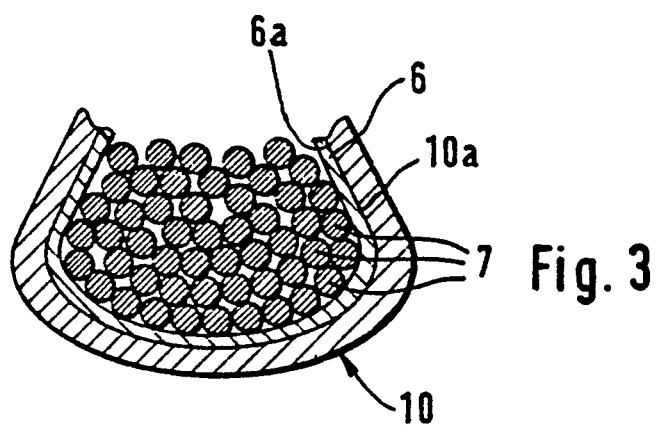

As shown form the comparison of FIGS. 2 and 3, the trough-shaped receptacle 5 has an inner wall surface 5a having a contour corresponding to the inner wall surface 10a of the canister 10. The insert 6 has an outer wall surface 6a having a contour corresponding to the inner wall surface contours of the receptacle and canister. The outer dimensions of the insert are somewhat less than the inner dimensions of the receptacle and canister.

It is understood that the foregoing description is that of the preferred embodiments of the invention and that various changes and modifications may be made thereto without departing from the spirit and scope of the invention as defined in the appended claims.

What is claimed is:

1. In a fuel rod loading system having a canister and an arrangement for loading the canister with irradiated fuel rods through a pass-through opening formed in the wall of a nuclear facility, the canister having a receiving opening and being docked at one side of said wall so as to cause the openings to be aligned with each other, the arrangement comprising:

a trough-shaped receptacle defining a longitudinal axis and being mounted at the other side of said wall so as to be aligned with said openings;

a trough-shaped insert movable between a first position in said canister wherein said insert is empty to a second position in said receptacle;

said insert defining an upwardly directed elongated opening extending parallel to said axis for loading the fuel rods into said insert when said insert is in said second position; and, drive means for moving said insert loaded with fuel rods from said second position through said openings and into said canister.

2. The arrangement of claim 1, said receptacle having an inner surface defining a first contour; said canister having a top wall and a lower wall connected to said top wall, said lower wall having an inner surface defining a second contour corresponding to said first contour; and, said insert having an outer wall surface defining a third contour corresponding in shape to said first and second contours so as to permit a snug fit of said insert in said canister.

* * * * *